United States Patent [19]
Iino

[11] Patent Number: 5,598,175
[45] Date of Patent: Jan. 28, 1997

[54] DISPLAY APPARATUS FOR VEHICLE

[75] Inventor: Tadashi Iino, Shizuoka, Japan

[73] Assignee: Yazaki Corporation, Tokyo, Japan

[21] Appl. No.: 610

[22] Filed: Jan. 5, 1993

[30]     Foreign Application Priority Data

Jan. 7, 1992   [JP]   Japan ................................. 4-156 U

[51] Int. Cl.$^6$ ................................................ G09G 3/02
[52] U.S. Cl. ................................ 345/7; 345/87; 359/13
[58] Field of Search ............................... 359/13, 14, 630;
340/705; 345/7, 87

[56]             References Cited

U.S. PATENT DOCUMENTS

| | | | |
|---|---|---|---|
| 4,973,132 | 11/1990 | McDonald | 359/13 |
| 5,066,525 | 11/1991 | Nakamachi | 359/13 |
| 5,128,659 | 7/1992 | Roberts | 345/7 |
| 5,252,955 | 10/1993 | Davis | 345/87 |

FOREIGN PATENT DOCUMENTS

| | | | |
|---|---|---|---|
| 0099427 | 4/1990 | Japan | 340/705 |
| 4009993 | 1/1992 | Japan | 358/13 |
| 2119950 | 11/1983 | United Kingdom | 359/14 |

*Primary Examiner*—Curtis Kuntz
*Assistant Examiner*—Minson Oh
*Attorney, Agent, or Firm*—Finnegan, Henderson, Farabow, Garrett & Dunner, L.L.P.

[57]             ABSTRACT

This invention relates to a display apparatus for a vehicle having a head up display with a hologram for reflecting display light from a displayer. The display apparatus for a vehicle according to the present invention comprises: a displayer for displaying vehicle information; a hologram having a reflecting function installed in the vicinity of a lower portion of a windshield, the hologram diffracting a display light from the displayer toward a driver of the vehicle; and a dark member attached to a rear face of the hologram to shield external light entering the hologram.

6 Claims, 2 Drawing Sheets

DISPLAY APPARATUS FOR VEHICLE

BACKGROUND OF THE INVENTION

1. Field of the Invention

This invention relates to a display apparatus for a vehicle, and more particularly, to a display apparatus for a vehicle, and even more particularly to a vehicle head up display (hereinafter referred as a "HUD") with a hologram for reflecting display light from a displayer.

2. Description of the Prior Art

Conventionally, a HUD-type display apparatus for a vehicle with a hologram has been used in which the hologram having a reflecting function is installed, for example, in a windshield. The hologram reflects display light from a displayer toward a view point E of a driver, permitting a virtual image of the displayer to be displayed behind and far from the windshield. For instance, as illustrated in FIG. 4, a displaying surface 1a of the displayer 1 is installed in the dashboard 2 with the displaying surface facing the windshield 3. A hologram 4 having a reflecting function is attached to an inner wall of the windshield 3 so that display light emitted from the displaying surface 1a of the displayer 1 passes through an opening 2a of the dashboard 2 and reflects off the hologram toward the view point E of the driver. As a result, when observed by the driver, a virtual image $X_1$ of the displayed image is recognized behind and far from the hologram 4.

As described above, using the hologram as a reflecting plate has the advantage of providing an image with high luminance, since light in a particular range of wavelengths is reflected efficiently. Secondly, the hologram may perform other optical functions, such as lens and concave mirror functions, which allows the viewing field to be widened or displaying system to be miniaturized. Thirdly, unlike an ordinary mirror or windshield, which can be used as a reflecting plate, using the hologram as the reflecting plate permits optical axes to be designed flexibly besides regular reflection with the same incident and reflection angles.

However, when sun light enters a hologram attached to the inner wall of a windshield as described above, flare or a ghost image is generated, which reduces the recognizability of the holograhpic image. Further, when observed from outside of the vehicle, the hologram appears to be colored, which is not preferable in appearance. Moreover, when the hologram is exposed to sun light for a long period of time, it may be deformed due to ultra violent rays, and infrared rays, and the like.

SUMMARY OF THE INVENTION

The present invention has been accomplished to overcome the drawbacks described above and the object thereof is to provide a HUD-type display apparatus for a vehicle in which the influence of external light such as sunlight is eliminated.

The display apparatus for a vehicle according to the present invention comprises: a displayer for displaying vehicle information; a hologram having a reflecting function installed in the vicinity of a lower portion of a windshield, the hologram diffracting a display light from the displayer toward a driver of the vehicle; and a dark member attached to a rear face of the hologram to shield external light entering the hologram.

BRIEF DESCRIPTION OF THE DRAWINGS

The present invention will be more apparent from the following description with reference to the accompanying drawings wherein.

DETAILED DESCRIPTION OF PREFERRED EMBODIMENTS

Figure 1:
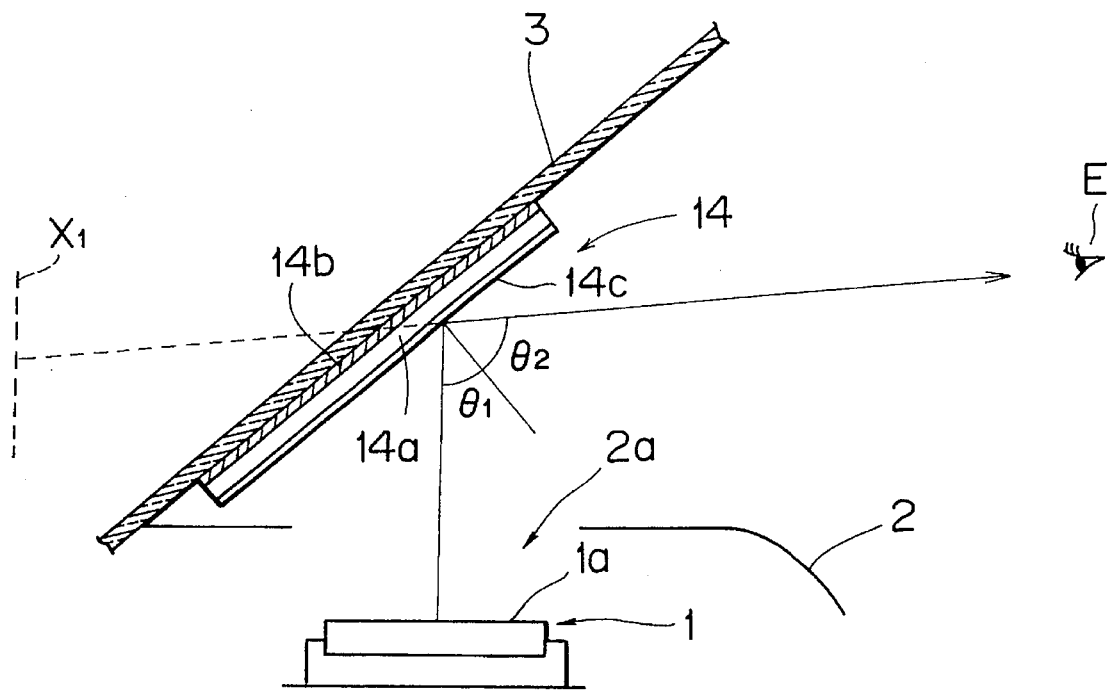
FIG. 1 is a side view of a display apparatus for a vehicle according to one embodiment of the present invention.

One embodiment of the present invention will be explained with reference to the drawings. The same reference characters as used in explaining the prior art designate corresponding parts or elements in the figures.

FIG. 1 shows a display apparatus for a vehicle according to one embodiment of the present invention.

The display apparatus is provided with a displayer 1 for displaying an image of various information on driving condition. The displayer 1 is light-emitting-type, which includes a fluorescent indicator tube and is disposed in a dashboard 2 with a displaying surface 1a facing a windshield 3. A hologram 14 having a reflection function is attached to an inner wall of the windshield 3, which is located over the dashboard 2. The hologram 14 comprises a dark film 14b, a transparent film 14c, and a hologram sensitized layer 14a between the two films. The hologram 14 has a reflecting function for reflecting light with particular wave length. The relation between the incident angle and the reflection angle can be adjusted as $\Theta_1 > \Theta_2$, or $\Theta_1 < \Theta_2$, with $\Theta_1 = \Theta_2$.

As described above, the reflecting function of the hologram 14 can be designed flexibly so that the light emitted from the displayer 1 can be reflected toward the view point E in accordance with the inclination of the windshield 3, permitting the display apparatus to be applied to various kinds of vehicles.

Figure 2:
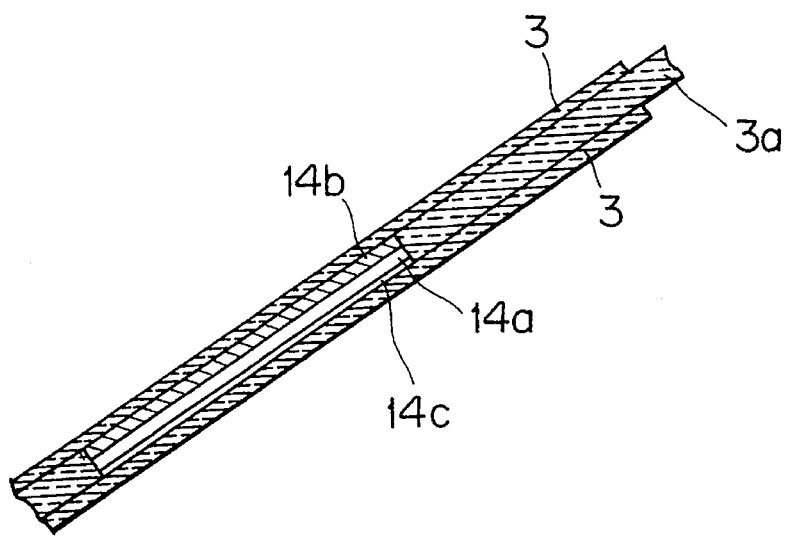
FIG. 2 shows another embodiment of the present invention in which the hologram is disposed between two pieces of glass.

In the above embodiment, the hologram 14 is attached to the inner wall of the windshield 3. Besides, as illustrated in FIG. 2, the hologram 14 may be put between a windshield made of a pair of glasses 3. In such a case, transparent synthetic resin film 3a is put between the pair of glasses 3 except for the portion where the hologram 14 is installed. In addition, instead of the dark film 14b of the hologram 14 described above, a transparent film may be used with a black ceramic material painted to the portion of the windshield where the hologram 14 is attached to or is put between the glasses 3.

Figure 3:
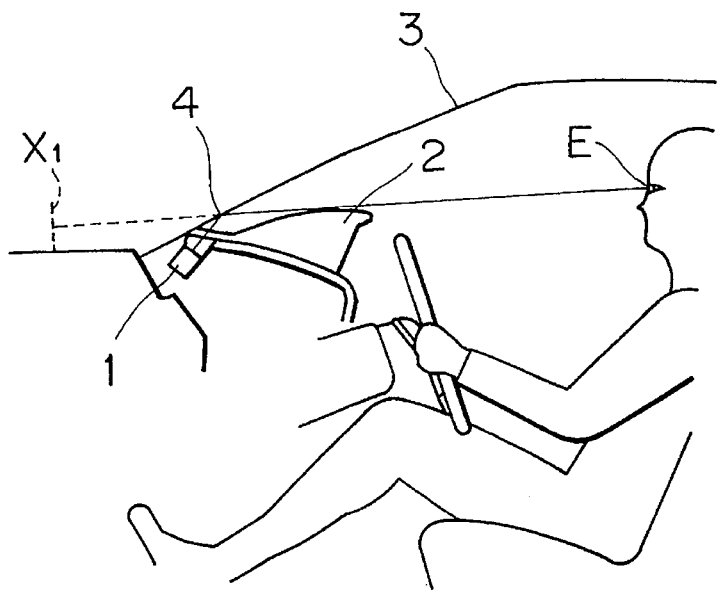
FIG. 3 is a view showing the display apparatus according to the present invention installed in a vehicle.
Figure 4:
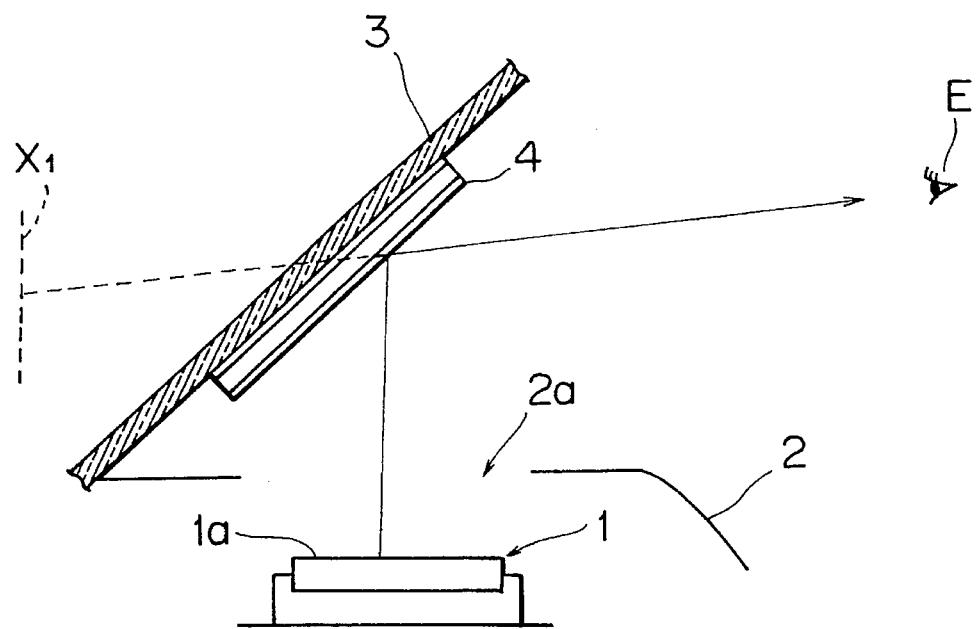
FIG. 4 is a view showing a conventional display apparatus for a vehicle in which a hologram is used as a reflecting plate.

FIG. 3 shows the display apparatus according to the present invention installed in a vehicle. One of the characteristics of the display apparatus according to the present invention is that the dark film 14b of light shielding function is applied to a rear face of the hologram 14 to act as a reflecting plate. Therefore, in order not to avoid blocking the viewfield of the driver, the hologram 14 may preferably be attached to a lower portion of the windshield 3. As a result, the virtual image $X_1$ of the display image of the displayer 1 is visible to the driver just over the upper surface of the dashboard 2.

As described above, with the display apparatus for a vehicle according to the present invention, since external light such as sun light does not enter the hologram, there is no fear that flare or a ghost image is generated, the hologram is not observed to be colored when seen from the outside of the vehicle, and problems of resistance to heat, ultraviolet rays, or the like can be solved.

What is claimed is:

1. A display apparatus for a vehicle comprising:

a displayer located within a vehicle for displaying vehicle information;

a non-transmissive dark member secured to a lower inside portion of a windshield; and a reflective hologram secured to the non-transmissive dark member, said reflective hologram diffracting a display light from the displayer toward a driver of the vehicle, said non-transmissive dark member having an area at least as large as an area of the reflective hologram to preclude all external light from entering the reflective hologram.

2. A display apparatus for a vehicle as claimed in claim 1, wherein said non-transmissive dark member includes a dark film.

3. A display apparatus for a vehicle as claimed in claim 1, wherein said non-transmissive dark member includes a black ceramic paint.

4. A display apparatus for a vehicle comprising:

a displayer located within a vehicle for displaying vehicle information;

a non-transmissive dark member secured between a lower portion of a first pane of glass of a windshield and a lower portion of a second pane of glass of the windshield; and a reflective hologram secured between the non-transmissive dark member and the second pane of glass, said reflective hologram diffracting a display light from the displayer toward a driver of the vehicle, said non-transmissive dark member having an area at least as large as an area of the reflective hologram to preclude all external light from entering the reflective hologram.

5. A display apparatus for a vehicle as claimed in claim 4, wherein said non-transmissive dark member includes a dark film.

6. A display apparatus for a vehicle as claimed in claim 4, wherein said non-transmissive dark member includes a black ceramic paint.

* * * * *